(12) United States Patent
Viglione et al.

(10) Patent No.: US 7,203,020 B1
(45) Date of Patent: Apr. 10, 2007

(54) SYSTEM AND METHOD FOR PARTICLE MONITORING FOR A HEAD DISK ASSEMBLY TO DETECT A HEAD DISK INTERFACE EVENT

(75) Inventors: Joseph M. Viglione, Laguna Hills, CA (US); Charles D. Flanigan, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 11/246,620

(22) Filed: Oct. 7, 2005

(51) Int. Cl.
*G11B 21/02* (2006.01)
*G11B 27/36* (2006.01)
*G11B 5/596* (2006.01)

(52) U.S. Cl. .................................. 360/75; 360/31
(58) Field of Classification Search ...................... None
See application file for complete search history.

(56) References Cited

U.S. PATENT DOCUMENTS

| | | | |
|---|---|---|---|
| 4,814,906 A * | 3/1989 | Suzuki et al. .................. 360/75 |
| 5,038,625 A | 8/1991 | Chen | |
| 5,055,698 A * | 10/1991 | Borden ........................ 250/574 |
| 5,136,438 A * | 8/1992 | Wakatsuki et al. ............. 360/69 |
| 6,052,890 A | 4/2000 | Malagrino, Jr. et al. | |
| 6,407,671 B1 | 6/2002 | Mulvihill et al. | |
| 2003/0067704 A1 * | 4/2003 | Woo et al. ..................... 360/69 |

* cited by examiner

*Primary Examiner*—Tan Dinh
*Assistant Examiner*—Jason Olson
(74) *Attorney, Agent, or Firm*—Jason T. Evans, Esq.; Blakely Sokoloff Taylor & Zafman

(57) ABSTRACT

Disclosed is a system and method for particle monitoring for a head disk assembly (HDA) to detect a head disk interface (HDI) event. A particle monitoring system includes a particle detector, an air sampling device, and a computer. The air sampling device is coupled to and in fluid communication with the particle detector. The air sampling device extends into the HDA to obtain an air sample. The particle detector is used to detect particles contained in the air sample. The computer is coupled to the particle detector and is configured to: monitor the particles detected by the particle detector; and declare an HDI event if the particles detected in the air sample match a pre-defined characteristic.

24 Claims, 6 Drawing Sheets

SYSTEM AND METHOD FOR PARTICLE MONITORING FOR A HEAD DISK ASSEMBLY TO DETECT A HEAD DISK INTERFACE EVENT

BACKGROUND

1. Field of the Invention

The present invention relates to a particle monitoring system and method for a head disk assembly (HDA) to detect a head disk interface (HDI) event.

2. Description of the Prior Art and Related Information

A huge market exists for disk drives for mass-market host computer systems such as servers, desktop computers, and laptop computers, as well as small form factor (SFF) disk drives for use in mobile computing devices (e.g. personal digital assistants (PDAs), cell phones, etc.). To be competitive, a disk drive should be relatively inexpensive and provide substantial capacity, rapid access to data, and reliable performance.

Satisfying these competing constraints of low-cost, small size, high capacity and reliability requires innovation in each of a drive's numerous components and in the methods of assembling and testing disk drives. Typically, the main assemblies of a disk drive are a head disk assembly (HDA) and a printed circuit board assembly (PCBA).

FIG. 1 shows the principal components of an example of a disk drive 100. With reference to FIG. 1, the disk drive 100 comprises a head disk assembly (HDA) 144 and a printed circuit board assembly (PCBA) 114. The HDA 144 includes a disk drive enclosure comprising a base 116 and a cover 117 attached to the base 116 that collectively house a disk stack 123 that includes one or a plurality of magnetic disks (of which only a first disk 111 and a second disk 112 are shown), a spindle motor 113 attached to the base 116 for rotating the disk stack 123, an HSA 120, and a pivot bearing cartridge 184 that rotatably supports the head stack assembly (HSA) 120 on the base 116. The spindle motor 113 rotates the disk stack 123 at a constant angular velocity.

The HSA 120 comprises a swing-type or rotary actuator assembly 130, at least one head gimbal assembly (HGA) 110, and a flex circuit cable assembly 180. The rotary actuator assembly 130 includes a body portion 140, at least one actuator arm 160 cantilevered from the body portion 140, and a coil portion 150 cantilevered from the body portion 140 in an opposite direction from the actuator arm 160. The actuator arm 160 supports the HGA 110 that, in turn, supports the slider(s). The flex cable assembly 180 may include a flex circuit cable and a flex clamp 159.

The HSA 120 is pivotally secured to the base 116 via the pivot-bearing cartridge 184 so that the slider at the distal end of the HGA 110 may be moved over the surfaces of the disks 111, 112. The pivot-bearing cartridge 184 enables the HSA 120 to pivot about a pivot axis, shown in FIG. 1 at reference numeral 182. The storage capacity of the HDA 144 may be increased by, for example, increasing the track density (the TPI) on the disks 111, 112 and/or by including additional disks in the disk stack 123 and by an HSA 120 having a vertical stack of HGAs 110 supported by multiple actuator arms 160.

The "rotary" or "swing-type" actuator assembly comprises body portion 140 that rotates on the pivot bearing 184 cartridge between limited positions, coil portion 150 that extends from one side of the body portion 140 to interact with one or more permanent magnets 192 mounted to back irons 170, 172 to form the voice coil motor (VCM), and the actuator arm 160 that supports the HGA 110. The VCM causes the HSA 120 to pivot about the actuator pivot axis 182 to cause the slider and the read write transducers thereof to sweep radially over the disk(s) 111, 112.

After the HDA 144 and the PCBA 114 are mated, the disk drive typically undergoes a variety of extensive tests and procedures to configure and validate the proper operation of the disk drive in a disk drive testing platform at a disk drive testing factory. This disk drive testing is a major expense in the cost of a disk drive.

A significant cost driver in disk drive testing is that there may be pre-existing media defects on one or more of the disks of a disk drive. These defects are typically not discovered until self-testing of the disk drive, which occurs as part of a configuration and validation process during the disk drive testing. During this testing, if a pre-existing media defect is discovered, this may result in a failure of the disk drive and consequently disk drive yield loss. Thus, the disk drive with the latent defect has utilized valuable disk drive testing time and space in the disk drive test platform. Even worse, the latent defect may not be discovered, and the disk drive may be shipped with the media defect only to be returned later by an unhappy customer.

These types of media defects typically occur due to a head disk interaction (HDI) in which the head contacts the disk. Further, when an HDI event occurs, particles, such as metal flakes, are created that can further damage the disk media as well as the read/write heads of the disk and other components of the disk drive.

HDI events may occur at a number of points in the disk drive assembly process prior to testing. For example, in the course of assembling the HDA, the head(s) are merged with the disk(s) during an operation known as a "head-disk merge operation." Unfortunately, during the head-disk merge one or more heads may contact the disk media, creating a potential reliability or yield problem from resultant media defects or other particle related damage.

HDI events may also occur after the head-disk merge operation, but before disk drive testing, during servo-writing of the disk media. During internal servo-writing, a servo writer typically controls the HDA, such that the actuator arm of the HDA is rotated to position the head radially over the disk in order to write servo sectors onto the disk based upon an output clock that has been processed by timing circuitry. During servo-writing, servo information is written in a plurality of servo sectors that are angularly spaced from one another and that are interspersed between data sectors around each track of each disk. This special servo information may be utilized by the disk drive to determine the position of the head by a servo control system of the disk drive. However, during this internal HDA servo-writing process, previously-described HDI events may occur due to the head contacting the disk media.

HDI events may also occur during external servo-writing, in which the servo information is written to a disk utilizing an external servo writer before the disk is assembled into the disk drive.

Thus, there are many points during the assembly of a disk drive in which an HDI event may occur, causing media defects to one or more disks.

SUMMARY

The present invention relates to a system and method for particle monitoring for a head disk assembly (HDA) to detect a head disk interface (HDI) event.

In one embodiment of the present invention, a particle monitoring system for a head disk assembly (HDA) comprises a particle detector, an air sampling device, and a computer. The HDA includes at least a disk, an actuator arm, and a head connected to a distal end of the actuator arm in which the actuator arm is rotatable about a pivot to position the head radially over the disk. The air sampling device extends into the HDA to obtain an air sample. The air sampling device is coupled to and in fluid communication with the particle detector. The particle detector is operable to detect particles contained in the air sample. The computer is coupled to the particle detector and is configured to: monitor the particles detected by the particle detector; and declare a head disk interface (HDI) event if the particles detected in the air sample match a pre-defined characteristic.

In another embodiment of the present invention, a method to detect a head disk interface (HDI) event occurring in a head disk assembly (HDA) is disclosed. The HDA includes at least a disk, an actuator arm, and a head connected to a distal end of the actuator arm in which the actuator arm is rotatable about a pivot to position the head radially over the disk. The method comprises: obtaining an air sample from the HDA; detecting particles contained in the air sample; and determining if the particles detected in the air sample match a pre-defined characteristic, and, if the particles match the pre-defined characteristic, declaring a head disk interface (HDI) event. The HDI event may represent contact between the head and the disk.

In yet another embodiment of the present invention, a particle monitoring system used to detect a head disk interface (HDI) event occurring in a head disk assembly (HDA) is disclosed. The HDA includes at least a disk, an actuator arm, and a head connected to a distal end of the actuator arm in which the actuator arm is rotatable about a pivot to position the head radially over the disk. A computer-readable medium is also disclosed, the medium having stored thereon instructions, which, when executed by a computer, cause the computer to perform operations comprising: detecting particle indication signals received from a particle detector, in which each particle indication signal corresponds to a particle detected by the particle detector, wherein the particle detector is coupled to and in fluid communication with an air sampling device that extends into the HDA to obtain an air sample; and determining whether the particle indication signals match a predefined characteristic, and, if so, declaring an HDI event. The HDI event may represent contact between the head and the disk.

The foregoing and other features of the invention are described in detail below and are set forth in the appended claims.

DETAILED DESCRIPTION

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
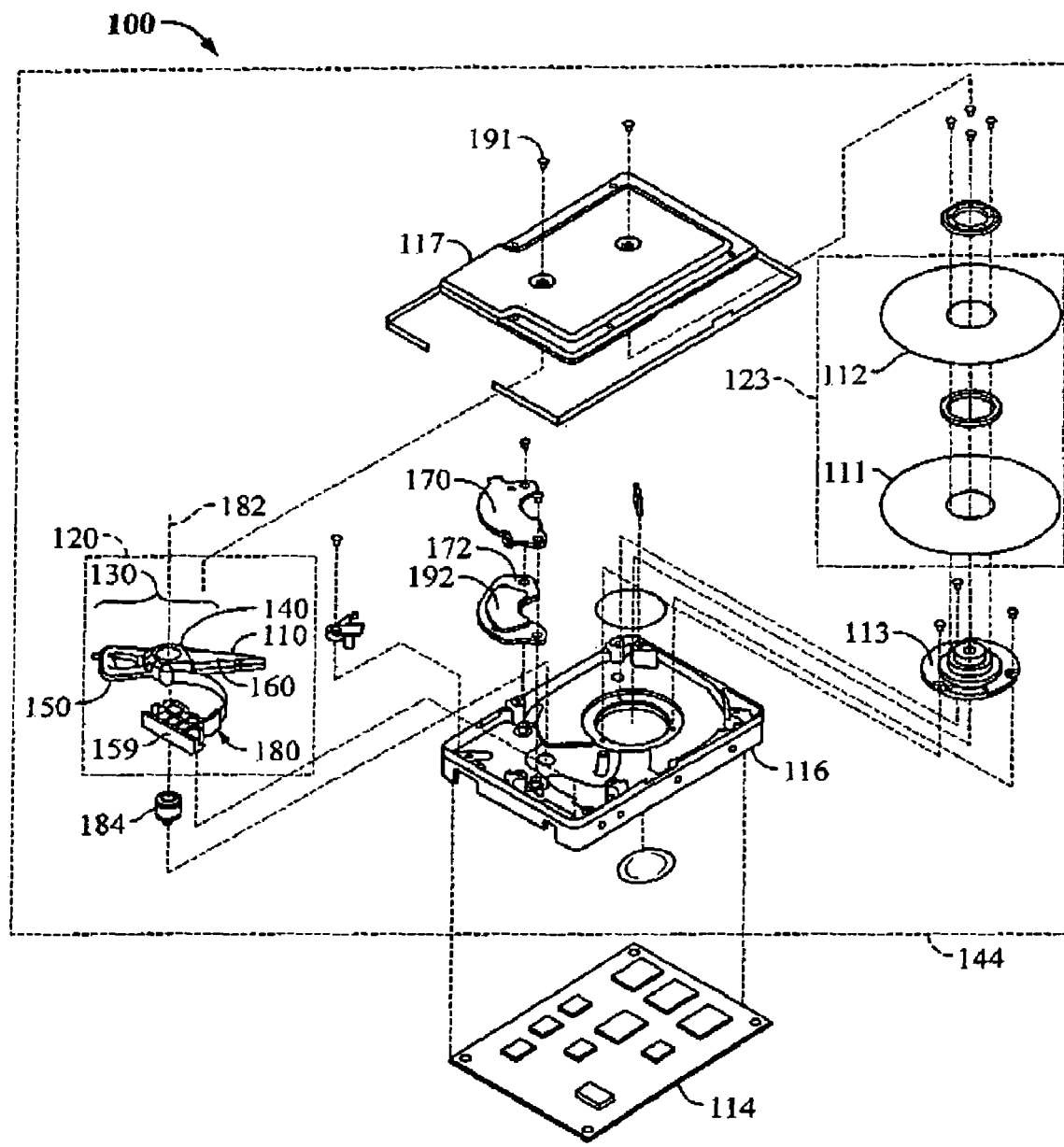
FIG. 1 is a diagram of the basic components of a disk drive.
Figure 2:
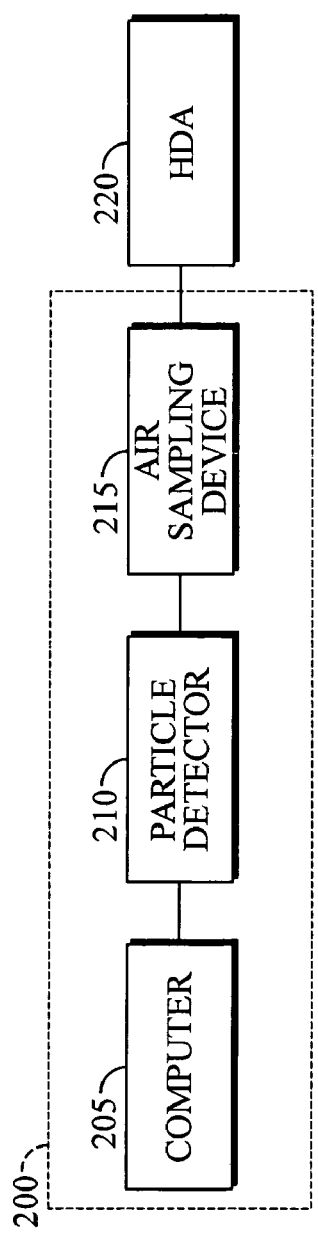
FIG. 2 is a block diagram of a particle monitoring system for a head disk assembly (HDA), according to one embodiment of the present invention.

With reference now to FIG. 2, FIG. 2 is a block diagram of a particle monitoring system 200 for a head disk assembly (HDA) 220, according to one embodiment of the present invention. Particularly, the particle monitoring system 200 may include a computer 205, a particle detector 210, and an air sampling device 215. As previously described, an HDA typically comprises at least a disk, an actuator arm, and a head connected to a distal end of the actuator arm in which the actuator arm is rotatable about a pivot to position the head radially over the disk.

The air sampling device 215 may be coupled to and in fluid communication with particle detector 210. In one embodiment, air sampling device 215 may extend into HDA 220 to obtain an air sample. The particle detector 210 preferably detects particles contained in the air sample.

A computer 205 may be coupled to the particle detector. Computer 205 is configured to: monitor particles detected by the particle detector and declare a head disk interface (HDI) event if the particles detected in an air sample match a pre-defined characteristic, as will be described below.

In one embodiment, air sampling device 215 includes an inlet device, such as a tube, that extends into the HDA 220. More particularly, a particle monitoring system 200 is disclosed that extends an inlet device, such as a tube, into an HDA, wherein the inlet device includes an inlet that is located proximate to disk surface areas, such that particles may be detected emanating from the disk surfaces.

As will be described, the particle detector may detect particulates that emerge during a head-disk contact (e.g. a head-slap or a head-crash), and computer 205 may declare an HDI event if the particles detected in the air sample match a pre-defined characteristic. It is well known that when a head crash or slap or other type of HDI event occurs, particles are generated from the HDI event, and a media defect often occurs on the disk media.

Figure 3:
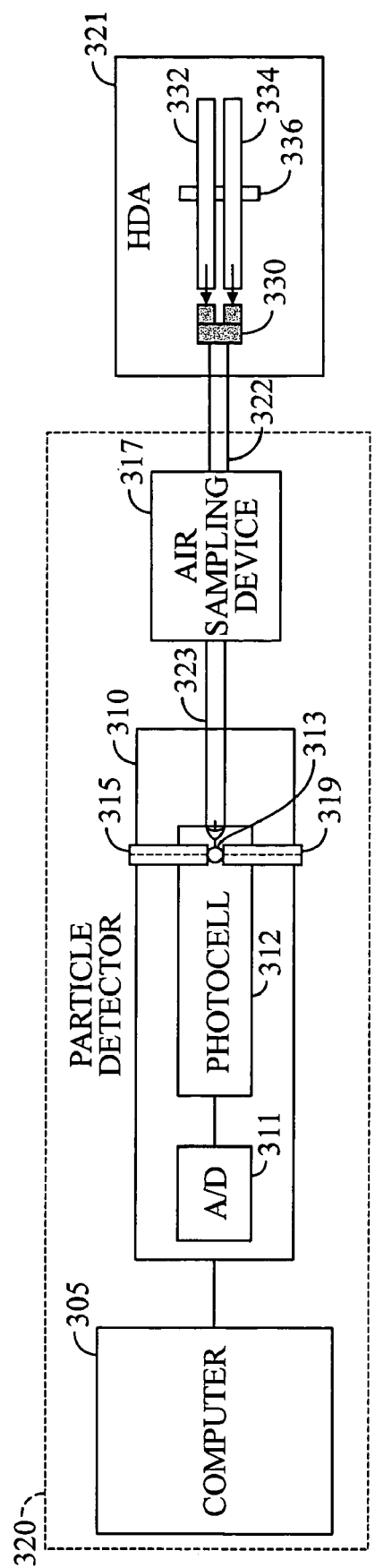
FIG. 3 is a diagram illustrating a more detailed example of a particle monitoring system, according to one embodiment of the present invention.

Referring now to FIG. 3, FIG. 3 is a block diagram illustrating a more detailed example of a particle monitoring system 320, according to one embodiment of the present invention. As shown in FIG. 3, an air sampling device 317 is coupled to and in fluid communication (e.g. air-flow communication) with both an HDA 321 and a particle detector 310. In this example, a simplified example of an HDA 321 is shown for illustrative purposes. As shown, HDA 321 includes a spindle 336 and two disks 332 and 334 mounted to spindle 336 for rotation with the spindle 336. For illustrative purposes, the actuator arm and the head of the HDA are not shown.

In one embodiment, air sampling device 317 includes a tube 322 with a manifold 330 at an end thereof. Tube 322 may be extended into HDA 321 such that manifold 330 is positioned near the disk platter. Each inlet tube comprising the manifold 330 may thereby be positioned proximate a disk surface of each disk (e.g. disk 332, 334, etc.). It should be appreciated that manifold 330 may have any suitable number of inlet tubes dependent upon the number of disks contained in the disk platter. In one example, the manifold may have two inlet tubes for each disk, i.e., one for each disk surface.

Alternatively, instead of a single tube 322 and a manifold 330 connected at the end thereof, a manifold of a suitable number of inlet tubes may be connected directly from air sampling device 317 into the HDA 321.

In one example, tubes 322 and manifold 330 may be made of stainless steel tubing to provide an inert and effective transmission means for the particles contained within the air sample. However, it should be appreciated that other types of tubes and manifolds may be made of other suitable materials, such as other types of metals, plastics, etc., in order to effectively transmit air samples and particles contained therein, dependent upon design and testing considerations.

Air sampling device 317 may be coupled to particle detector 310 to provide an air sample from HDA 321 through tube 323, or via other suitable transmission devices, such that particle detector 310 can detect particles contained in the air sample. Air sampling device 317 may be configured to sample a pre-defined volume of air from the HDA 321 at a pre-defined air-flow rate for a pre-defined amount of time. Air sampling device 317 may include a vacuum and suitable control circuitry to implement this functionality, as should be appreciated by those of skill in the art. Particularly, air sampling device 317 may be configured to provide an appropriate volume of air to particle detector 310 at a suitable air-flow rate for an appropriate amount of time. Of course, in other embodiments, the air sampling device may comprise a tube, and the vacuum and circuitry may be integrated into the particle detector.

In one embodiment, particle detector 310 may include a photocell 312 coupled to tube 323 and to an analog to digital (A/D) converter 311. Particularly, when a particle 313 passes between a light emitter 315 and a light receiver 319 of the photocell 312, a voltage drop occurs. This voltage drop is converted by A/D converter 311 into a particle indication signal that is transmitted to computer 305 via a suitable connection.

As will be discussed, in one embodiment, particle detector 310 may be configured to detect particles having at least a 0.2 micron diameter. Further, the particle indication signals may be utilized by computer 305 to determine if the particles detected in an air sample match a pre-defined characteristic sufficient to declare an HDI event. Computer 305 may then provide an indicator to a test operator that one or more disks of the HDA or the HDA itself, should be quarantined. For example, a visual indicator may be displayed on a display device of computer 305 and/or an audible indicator may be utilized. In another embodiment, the computer 305 may provide the indicator to another computer (not shown) that may automatically quarantine the HDA.

It should be appreciated that various types of standard commercially-available particle detectors may be utilized for this purpose and are well known in the art. The previously-described particle detector is but one example.

Particularly, in one embodiment, a LIGHTHOUSE WORLDWIDE SOLUTIONS model 2014 particle detector may be utilized. This type of particle detector is sensitive enough to detect particles having a 0.2 micron diameter, has a flow rate of 0.1 cubic feet per minute, and has been found to operate well in determining HDI events.

Computer 305 may be specifically configured to monitor for the particles detected by particle detector 310, and to declare a head disk interface (HDI) event if the particles detected in the air sample match a pre-defined characteristic.

Particularly, computer 305 may be configured to detect particle indication signals received from particle detector 310 (e.g. digital signals from A/D converter 311) over a suitable connection and interface, in which each particle indication signal corresponds to a particle detected by the particle detector. Further, computer 305, based upon the received particle indication signals, may determine whether the particle indication signals match a pre-defined characteristic, and, if so, declare an HDI event. The HDI event may be representative of a contact between a head and a disk of the HDA, such as a head-slap or head-crash, indicating a high probability of a media defect being present on the disk as a result. The pre-defined characteristic may correspond to a pre-defined number of particle indication signals received by computer 305 over a pre-defined interval of time, which has been previously modeled to represent a type of HDI event, such as a head-slap due to a bent gimbal, a bent actuator arm, an off-center disk mounting, a shock to the HDA etc. In another embodiment, the computer 305 may be configured to receive particle indication signals that comprise information regarding the size of the particles detected. The pre-defined characteristic may then correspond to a number of particles of a certain size, or to particle size distributions that have been shown to represent an HDI event. Other pre-defined characteristics are also possible.

During testing of an HDA, based upon the computer declaring an HDI event, computer 305 may provide an indicator to a test operator that at least one or more disks of the HDA should be quarantined. In this way, by detecting an HDI event as early as possible, disk drives with potential latent defects can be eliminated from the general test population before disk drive platform testing, such that they can be reworked or subject to special screens, thereby making more efficient use of disk drive testing facilities and reducing potential customer returns of defective disk drives.

The use of the particle monitoring system and associated methods, according to embodiments of the invention, may be used to monitor for HDI events at various points in the assembly of the disk drive prior to full disk drive platform testing. Particularly, the particle monitoring system and method to monitor for HDI events may be utilized during the head-disk merge process in the assembly of a disk drive, as part of an internal servo-writing process of the disks of the disk drive, and during external servo-writing of disks prior to their assembly into a disk drive.

It should be appreciated that computer 305 may be any type of computing device, such as a personal computer (PC) running, for example, a LINUX operating system or a MICROSOFT operating system, such as a WINDOWS type operating system. Computer 305 may include a suitable processor, memory, and suitable I/O interfaces to implement the various embodiments of the invention. In another embodiment, the computer may simply comprise a processor, memory and appropriate control code integrated into the particle detector.

Components of the various embodiments of the invention may be implemented as hardware, software, firmware, microcode, or any combination thereof. When implemented in software, firmware, or microcode, the elements of the embodiment of the present invention are the program code or code segments that include instructions to perform the necessary tasks. A code segment may represent a procedure, a function, a subprogram, a program, a routine, a subroutine, a module, a software package, a class, or any combination of instructions, data structures, or program statements.

The program or code segments may be stored in a computer or processor readable medium or transmitted by a computer data signal embodied in a carrier wave, or a signal modulated by a carrier, over a transmission medium. The "processor readable or accessible medium" or "computer readable or accessible medium" may include any medium that can store, transmit, or transfer information. Examples of computer accessible media include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The code segments may be downloaded via computer networks such as the Internet, Intranet, etc. The computer accessible medium may include data that, when accessed by a computer, cause the computer to perform the operations described herein. The term "data" herein refers to any type of information that is encoded for machine-readable purposes. Therefore, it may include programs, code, data, files, etc.

All or portions of the embodiments of the invention may be implemented by software by computer 305. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

Various implementations of the particle monitoring system 320 and methods therefore will now be described in different environments.

Figure 4:
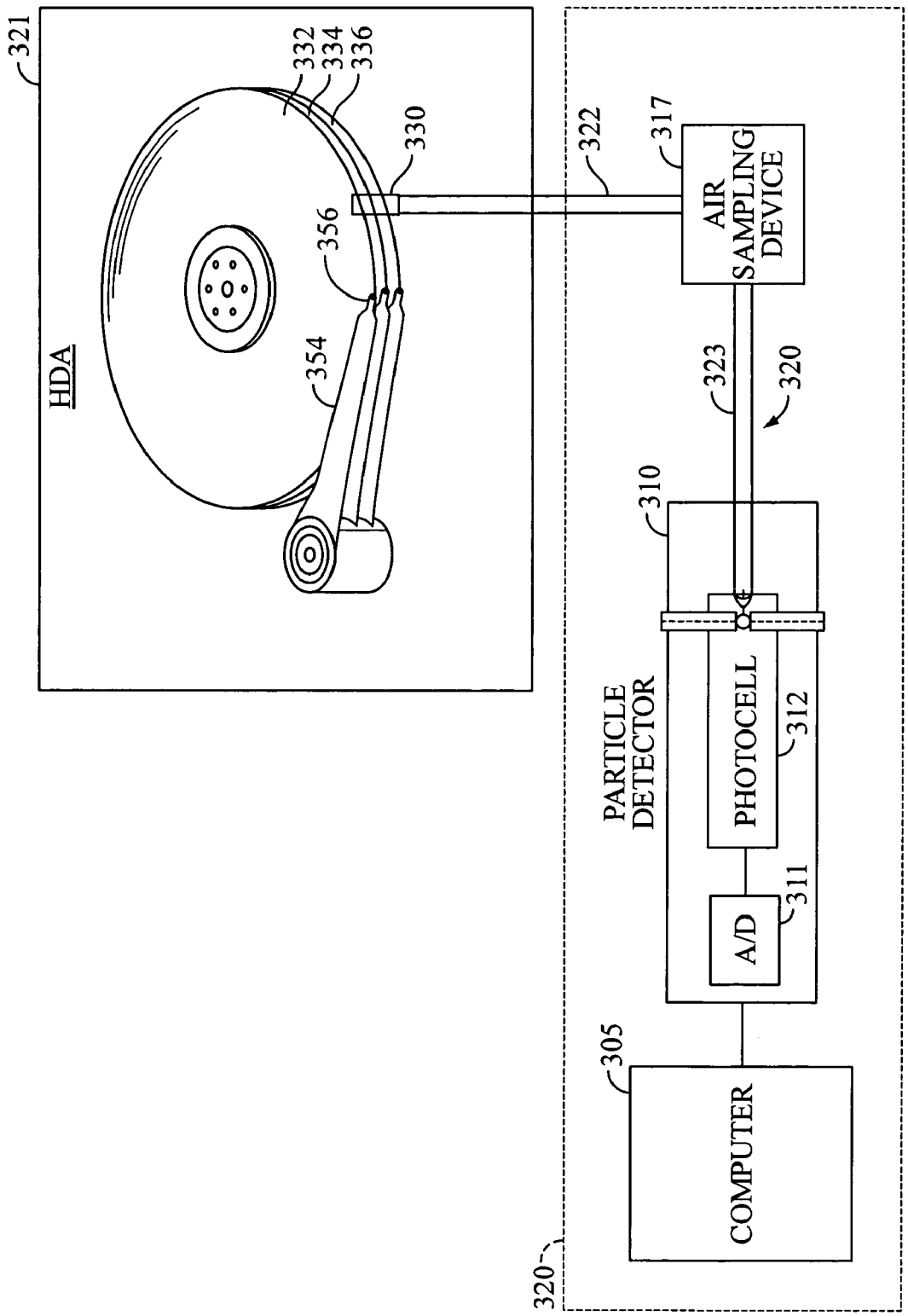
FIG. 4 is a diagram illustrating a particle monitoring system being utilized to monitor for an HDI event during a head-disk merge process in the assembly of a disk drive, according to one embodiment of the invention

With reference to FIG. 4, FIG. 4 is a diagram illustrating particle monitoring system 320 being utilized to monitor for an HDI event during a head-disk merge process in the assembly of a disk drive, according to one embodiment of the invention. During the head-disk merge operation, actuator arms 354 having heads 356 connected to distal ends of the actuator arms, respectively, are pivoted and loaded onto respective disks 332, 334, and 336. Unfortunately, during the head-disk merge operation, head-slaps or head-crashes may occur in which the heads contact the disks, resulting in disk media defects. Due to these disk media defects, the disk drive may be inoperable and may have to be removed during later stages of the disk drive testing process, as previously described.

In one embodiment, tube 322 may be inserted through a port of the base of HDA 321 and clamped to the base, such that each inlet pipe of manifold 330 is located adjacent to a head 356 of an actuator arm 354, respectively, during the head-disk merge operation. In this way, particle monitoring system 320 may be able to detect and declare a head disk interface (HDI) event if particles are detected in the air sample that match a pre-defined characteristic during the head-disk merge operation.

Particularly, computer 305 may detect particle indication signals received from particle detector 310, in which each particle indication signal corresponds to a particle detected by the particle detector 310 received during air sampling. Air sampling device 317 may sample air from HDA 321 for a pre-defined time period to cover the entire head-disk merge operation (e.g. 10 seconds, 15 seconds, etc.).

When computer 305 determines that the particle indication signals match a pre-defined characteristic, computer 305 declares an HDI event, in which the HDI event is indicative of contact between a head and a disk, and computer 305 may then provide an indicator to a test operator that at least one or more disks of the HDA should be quarantined.

For example, the pre-defined characteristic may correspond to a pre-defined number of particle indication signals that occur during a pre-defined period of time, as will be described in more detail later.

By detecting an HDI event early, during the head-disk merge operation, disk drives with potential latent defects can be eliminated from the general test population, thereby making more efficient use of disk drive testing facilities and reducing potential consumer disk drive returns.

In another embodiment, particle monitoring system 320 and the methods therefore may be implemented in conjunction with an HDA servo-writer 536 used to implement a servo-writing process.

Figure 5:
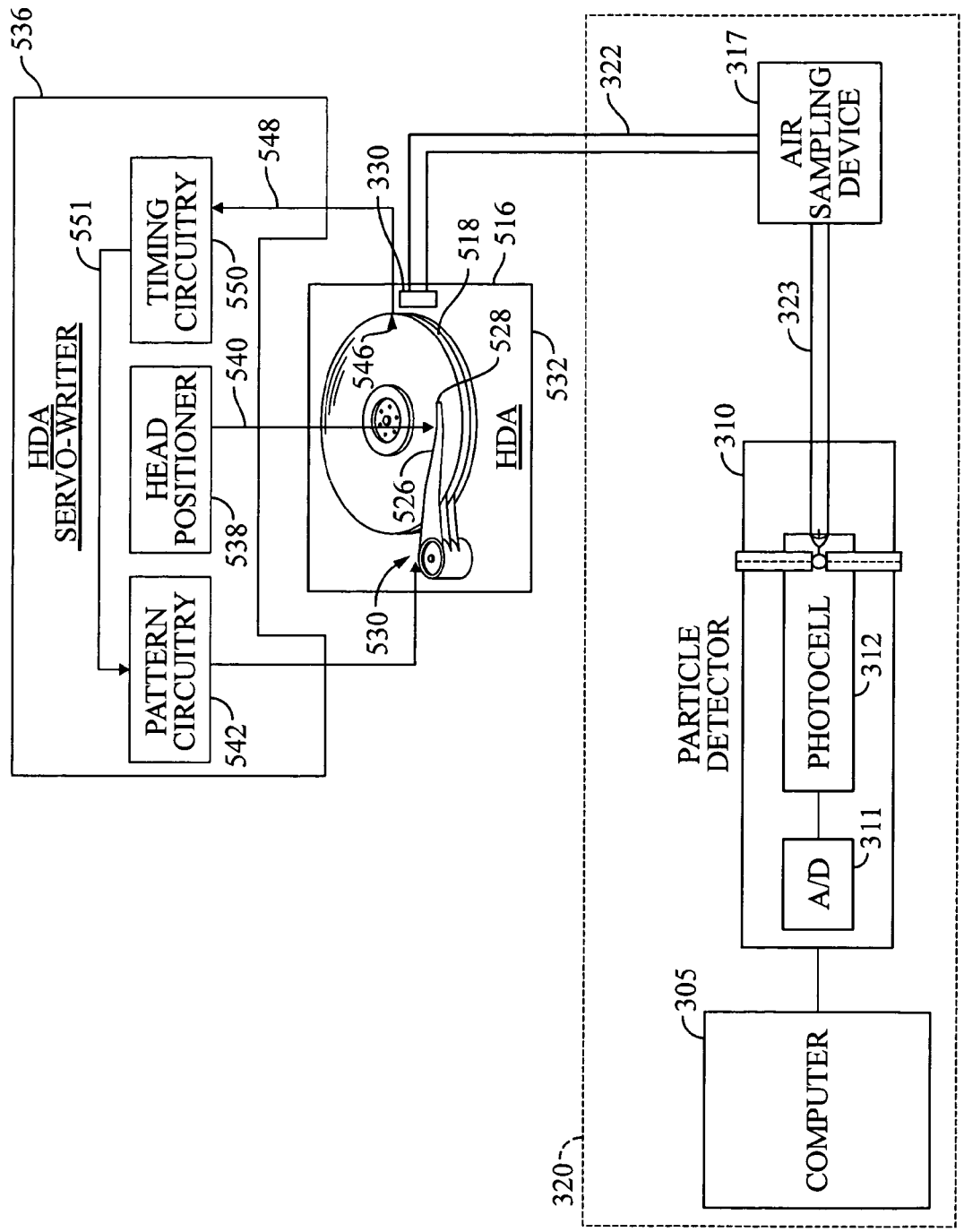
FIG. 5 is a diagram illustrating a particle monitoring system being utilized in conjunction with a servo writer implementing a servo-writing process to an HDA of a disk drive, according to one embodiment of the present invention.

Turning now to FIG. 5, a diagram is shown, illustrating particle monitoring system 320 being utilized in conjunction with an HDA servo writer 536 implementing a servo-writing process to an HDA 516 of a disk drive 532, according to one embodiment of the present invention.

As shown in FIG. 5, HDA servo writer 536 operates in an internal environment, in which servo writer 536 writes servo sectors and other servo information to disk(s) 518 of an HDA 516 of a disk drive 532.

The disk drive 532 comprises HDA 516, including disks 518, actuator arms 526, and corresponding heads 528 coupled to distal ends of actuator arms 526, respectively, and a voice coil motor 530 for rotating actuator arms 526 about a pivot to position heads 528 radially over the disks 518. A write clock may be synchronized to the rotation of the disks 518, and a plurality of servo sectors may be written onto the disks 518 at predetermined radial locations determined from the write clock and timing circuitry 550.

HDA servo writer 536 comprises a head positioner 538 for actuating a head positioning pin 540 using position measurement circuitry, such as a laser interferometer or optical encoder. Pattern circuitry 542 generates the data sequence written to the disks 518 for the servo sectors. An optical or magnetic clock head 546 reads an optical or magnetic clock track to generate a clock signal 548 processed by timing circuitry 550 to synchronize a write clock servo 551 so that the servo wedges are written at appropriate radial positions. This optical or magnetic clock track may be formed at the outside radius of at least one disk 518, or it may also be formed at the inside radius of at least one disk 518, or it may be formed or written on some other rotating member of the disk drive such as a spindle motor hub or the disk attachment clamp.

Particularly, HDA servo writer 536 controls the HDA 516, such that actuator arms 526 are rotated to position heads 528 over the disks 518 in order to write servo sectors onto the disks 518 based on the output clock signal 551 that has been processed by timing circuitry 550.

It should be appreciated that this is but one simplified example of an internal HDA servo writer system and that many other types of internal servo writer systems may be utilized with embodiments of the invention.

During the servo writing process in which the HDA servo writer 536 controls the HDA 516 in order to write servo sectors onto the disks 518, particle monitoring system 320 may be utilized to monitor for HDI.

In one embodiment, tube 322 may be inserted through a port of the base of HDA 516 and clamped to the base, such that each inlet pipe of manifold 330 is located near a head 528 of an actuator arm 526, respectively, during the servo-writing process. In this way, computer 305 of the particle monitoring system 320 may detect particle indication signals received from the particle detector 310 based on air samples from the air sampling device 317, in which each particle indication signal corresponds to a particle detected by the particle detector. Air sampling device 317 may sample air from the HDA continuously or periodically for pre-defined periods of time during the servo-writing process.

Computer 305 may determine whether the particle indication signals from the particle detector 310 match a pre-defined characteristic, and, if so, computer 305 may declare an HDI event indicative of contact between a head and a disk during the servo-writing process. If an HDI event is declared, computer 305 may provide an indicator that at least one disk of the HDA undergoing servo-writing should be quarantined. For example, the pre-defined characteristic may correspond to a pre-defined number of particle indication signals occurring in a pre-defined period of time.

Figure 6:
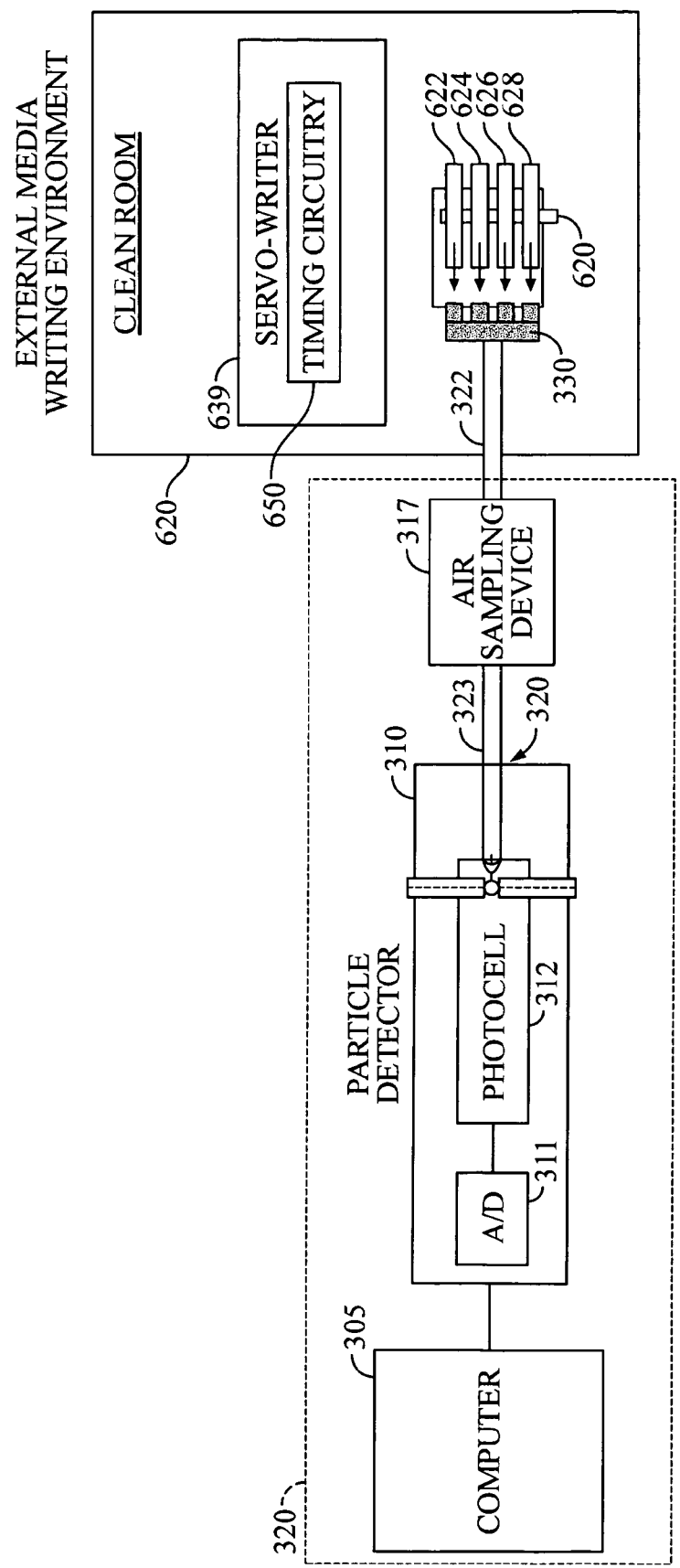
FIG. 6 is a diagram illustrating a particle monitoring system being utilized in conjunction with an external media servo writer, according to one embodiment of the present invention.

With reference now to FIG. 6, FIG. 6 is a diagram illustrating particle monitoring system 320 being utilized in conjunction with an external media servo writer 639, according to one embodiment of the present invention. In this example, external servo writer 639 operates in an external media writing environment 620, such as a clean room. For example, in an external media writing environment, multiple disks (e.g. 622, 624, 626, and 628) may be servo-written without having to be located in a disk drive.

Similar to the servo writer described in FIG. 5, external servo writer 639 may likewise control components of what is typically considered to be part a traditional HDA, such as actuator arms and heads respectively attached thereto, such that heads are radially positioned over disks, respectively, in order to write servo sectors onto the disks based upon output clock timing circuitry 650. For brevity's sake, actuator arms and heads have not been shown so as not to obscure the figure. It should be appreciated that external servo writers are well known in the art. It should also be appreciated that in this example of an external servo writer, a broader interpretation is given to the term HDA for simplicity of description in order to describe a plurality of disks in a disk stack for servo-writing by actuator arms and heads respectively attached thereto, as opposed to the more traditional description of an HDA, which as previously described, includes other components in addition to disks, actuator arms, heads, etc. such as a base, a VCM, etc.

It should be appreciated that this is but one example of an external servo writer system, and that many other types of external servo writers may be utilized with embodiments of the invention.

Similar to the previously described utilization of the particle monitoring system 320, computer 305 may be used to detect particle indication signals received from particle detector 310, in which each particle indication signal corresponds to a particle being detected by the particle detector. As previously described, particle detector 310 receives an air sample from air sampling device 317. Air sampling device 317 may sample air from the external servo writer continuously or periodically for pre-defined time periods during the external servo writing process.

Computer 305 determines whether particle indication signals match a pre-defined characteristic, and if so, computer 305 may declare an HDI event representative of contact between heads of the external media servo writer and the disks. As will be discussed, the pre-defined characteristic may correspond to a pre-defined number of particle indication signals occurring in a pre-defined period of time.

If an HDI event is declared, computer 305 may provide an indicator to an operator that at least one disk of the head disk assembly in the external media writing environment should be quarantined.

Thus, as previously discussed, the particle monitoring system 320 and the methods associated therewith can be utilized to detect HDI events associated with the head-disk merge operations, internal servo writing, and external servo writing. By detecting an HDI event as early as possible, disk drives with potential latent defects can be eliminated from the general test population, thereby making more efficient use of disk drive testing facilities and reducing potential customer disk drive returns.

As has been previously discussed, a computer can be programmed to determine whether particle indication signals match a pre-defined characteristic and, if so, to declare an HDI event that is representative of contact between the head and the disk. Typically, the pre-defined characteristic will correspond to a pre-defined number of particle indication signals occurring in a pre-defined period of time. These pre-defined characteristics can be modeled by prior characterization testing for different types of HDI events that would occur during head-disk merging and servo-writing, such as those caused by bent gimbals, bent actuator arms, shocks to the HDA, etc. Based upon this prior modeling, a computer can be utilized to identify HDI events.

Figure 7:
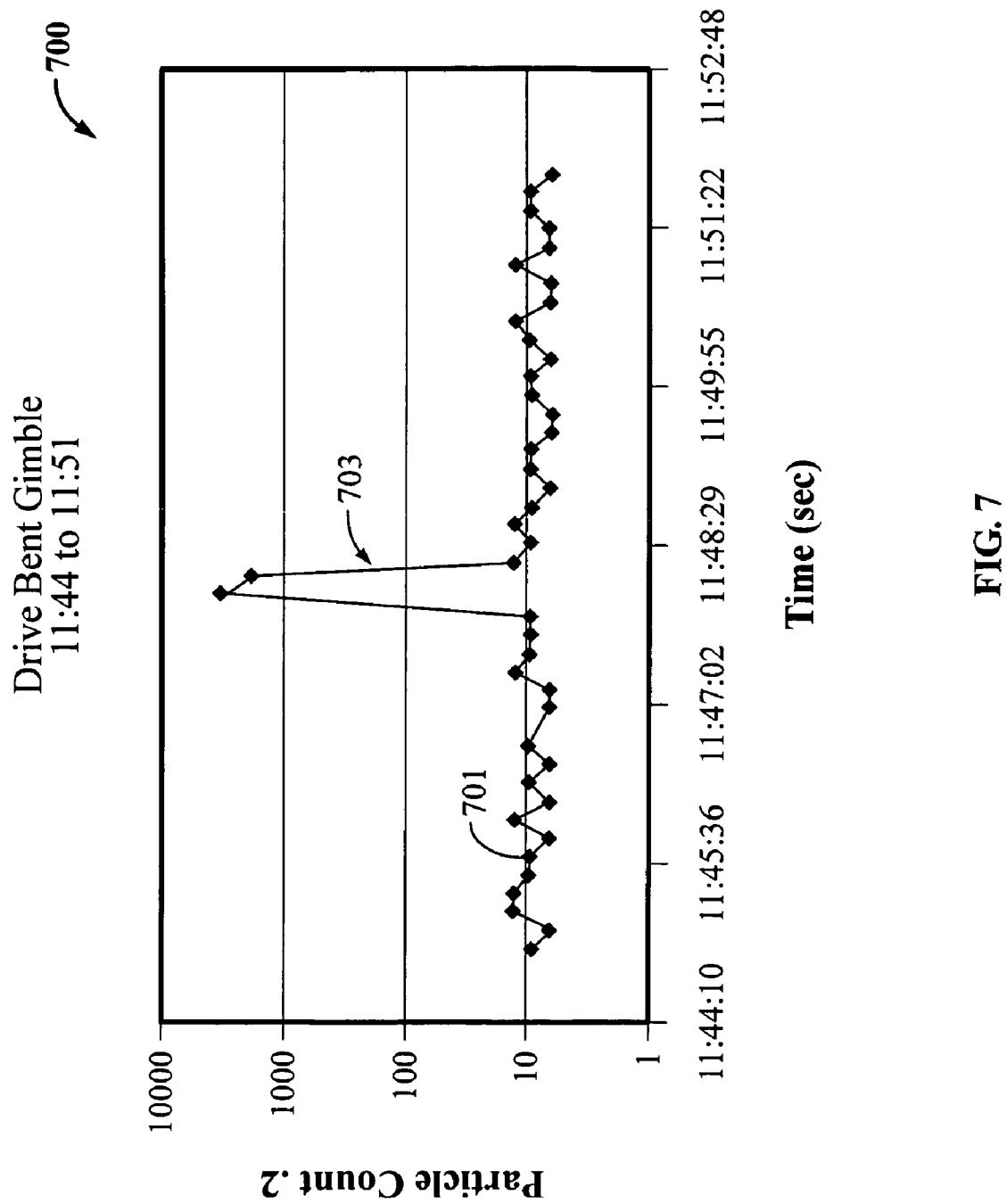
FIG. 7 is a graph of a number of particle indication signals (y-axis) that occur over a pre-defined period of time (x-axis) in the event that a bent gimbal causes an HDI event.

Turning now to FIG. 7, FIG. 7 is an example 700 of a graph 701 of the number of particle indication signals (y-axis) that occur over a pre-defined period of time (x-axis) in the event that a bent gimbal causes an HDI event.

Looking to FIG. 7, FIG. 7 is a graph illustrating an HDI event 703 occurring as the result of a bent gimbal during a head-disk merge operation. As can be seen in FIG. 7, over a testing time of approximately seven minutes from 11:44 to 11:51 (x-axis) as the disk drive was rotated and a head was loaded onto a disk, a bent gimbal during the time period from 11:47 to 11:48 and 29 seconds resulted in a HDI event 703. The HDI event 703 was characterized by a spike of over 1000.2 micron or larger particles being detected (y-axis), which is representative of an HDI event that would cause a media defect to a disk.

Based on such testing, it should be understood by those of skill in the art that a computer 305 of the particle monitoring system 320 can be pre-programmed with pre-defined characteristics representative of HDI events due to certain conditions such as bent gimbals, bent actuator arms, shocks to the HDA, etc., such that computer 305 can accurately declare HDI events based upon particle indication signals from the particle detector matching these pre-modeled and pre-defined characteristics. It should also be noted that particle detectors configured to detect particles having at least a 0.2 micron diameter have been found to be optimal in testing.

It should be appreciated by those with skill in this art that, although embodiments of the invention have been previously described with reference to particular structural implementations such as utilizing tubes, air sampling devices, particle detectors, and computers, embodiments of the invention may be utilized with a wide variety of different types of computers and test equipment, and in different sorts of disk drive testing environments in order to detect HDI events that may be representative of disk media defects.

We claim:

1. A particle monitoring system for a head disk assembly (HDA), the HDA comprising at least a disk, an actuator arm, and a head connected to a distal end of the actuator arm in which the actuator arm is rotatable about a pivot to position the head radially over the disk, the particle monitoring system comprising:
   an air sampling device extending into the HDA to obtain an air sample;
   a particle detector external to the HDA coupled to and in fluid communication with the air sampling device, the particle detector operable to detect particles contained in the air sample; and
   a computer coupled to the particle detector, the computer configured to:
      monitor the particles detected by the particle detector; and
      declare a head disk interface (HDI) event if the particles detected in the air sample match a pre-defined characteristic.

2. The particle monitoring system of claim 1, wherein the air sampling device includes a tube that extends into the HDA.

3. The particle monitoring system of claim 1, wherein the air sampling device is configured to sample a pre-defined volume of air from the HDA at a pre-defined air-flow rate for a pre-defined amount of time.

4. The particle monitoring system of claim 3, wherein the particle detector further comprises a photocell to detect particles, such that when a particle passes through the photocell, a voltage drop occurs that is converted into a particle indication signal that is transmitted to the computer.

5. The particle monitoring system of claim 4, wherein the particle detector is configured to detect particles having at least a 0.2 micron diameter.

6. The particle monitoring system of claim 4, wherein the particle indication signals are utilized by the computer to determine if the particles detected in the air sample match the pre-defined characteristic.

7. The particle monitoring system of claim 6, wherein the pre-defined characteristic corresponds to a pre-defined number of particle indication signals being received by the computer in the pre-defined interval of time.

8. The particle monitoring system of claim 1, wherein if the computer declares the HDI event, the computer provides an indicator that at least the disk of the HDA should be quarantined.

9. The particle monitoring system of claim 1, wherein the particle monitoring system monitors for the HDI event as part of a head merge process in an assembly of a disk drive.

10. The particle monitoring system of claim 1, wherein the particle monitoring system monitors for the HDI event as part of an internal servo-writing process.

11. The particle monitoring system of claim 1, wherein the particle monitoring system monitors for the HDI event as part of an external servo-writing process.

12. A method to detect a head disk interface (HDI) event occurring in a head disk assembly (HDA), the HDA comprising at least a disk, an actuator arm, and a head connected to a distal end of the actuator arm in which the actuator arm is rotatable about a pivot to position the head radially over the disk, the method comprising:
   obtaining an air sample from the HDA;
   detecting particles contained in the air sample external to the HDA;
   determining if the particles detected in the air sample match a pre-defined characteristic; and
   if the particles match the pre-defined characteristic, declaring a head disk interface (HDI) event, the HDI event representing contact between the head and the disk.

13. The method of claim 12, further comprising sampling a pre-defined volume of air from the HDA at a pre-defined air-flow rate for a pre-defined amount of time.

14. The method of claim 12, wherein detecting the particles contained in the air sample and determining if the particles detected in the air sample match the pre-defined characteristic further comprises:
   detecting when a particle passes through a photocell;
   generating a particle indication signal when the particle passes through the photocell;
   detecting particle indication signals; and
   determining if the detected particle indication signals match the pre-defined characteristic, the pre-defined characteristic corresponding to a pre-defined number of particle indication signals occurring in a pre-defined period of time.

15. The method of claim 12, wherein, if the HDI event is declared, further comprising providing an indicator that at least the disk of the HDA should be quarantined.

16. The method of claim 12, wherein determining whether the particles detected in the air sample match the pre-defined characteristic occurs as part of a head merge process in an assembly of the disk drive.

17. The method of claim 12, wherein determining whether the particles detected in the air sample match the pre-defined characteristic occurs as part of an internal servo-writing process.

18. The method of claim 12, wherein determining whether the particles detected in the air sample match the pre-defined characteristic occurs as part of an external servo-writing process.

19. In a particle monitoring system to detect a head disk interface (HDI) event occurring in a head disk assembly (HDA), the HDA comprising at least a disk, an actuator arm, and a head connected to a distal end of the actuator arm in which the actuator arm is rotatable about a pivot to position the head radially over the disk, a computer-readable medium having stored thereon instructions, which when executed by a computer cause the computer to perform the operations comprising:
   detecting particle indication signals received from a particle detector external to the HDA, each particle indication signal corresponding to a particle detected by the particle detector, the particle detector coupled to and in fluid communication with an air sampling device that extends into the HDA to obtain an air sample; and
   determining whether the particle indication signals match a pre-defined characteristic, and, if so, declaring an HDI event, the HDI event representing contact between the head and the disk.

20. The computer-readable medium of claim 19, wherein if the HDI event is declared, further comprising instructions to cause the computer to provide an indicator that at least the disk of the HDA should be quarantined.

21. The computer-readable medium of claim 19, wherein the pre-defined characteristic corresponds to a pre-defined number of particle indication signals occurring in a pre-defined period of time.

22. The computer-readable medium of claim 19, wherein the operation of determining whether the particle indication signals match the pre-defined characteristic for the HDA occurs as part of a head merge process in an assembly of a disk drive.

23. The computer-readable medium of claim 19, wherein the operation of determining whether the particle indication signals match the pre-defined characteristic for the HDA occurs as part of an internal servo-writing process.

24. The computer-readable medium of claim 19, wherein the operation of determining whether the particle indication signals match the pre-defined characteristic for the HDA occurs as part of an external servo-writing process.

* * * * *